United States Patent
Panicker et al.

(10) Patent No.: US 8,724,723 B2
(45) Date of Patent: May 13, 2014

(54) METHOD AND SYSTEM FOR REDUCED COMPLEXITY CHANNEL ESTIMATION AND INTERFERENCE CANCELLATION FOR V-MIMO DEMODULATION

(75) Inventors: John P. Panicker, Orleans (CA); Gary D. Boudreau, Kanata (CA); Michael Petras, Nepean (CA); Ed Illidge, Kanata (CA)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 13/129,316

(22) PCT Filed: Nov. 12, 2009
(Under 37 CFR 1.47)

(86) PCT No.: PCT/CA2009/001627
§ 371 (c)(1),
(2), (4) Date: May 13, 2011

(87) PCT Pub. No.: WO2010/054474
PCT Pub. Date: May 20, 2010

(65) Prior Publication Data
US 2011/0293028 A1    Dec. 1, 2011

Related U.S. Application Data

(60) Provisional application No. 61/114,351, filed on Nov. 13, 2008.

(51) Int. Cl.
*H04L 27/28*    (2006.01)
(52) U.S. Cl.
USPC .......................................... 375/260; 375/259
(58) Field of Classification Search
CPC ................................................... H04J 11/0036
USPC ................................................... 375/260, 259
See application file for complete search history.

(56) References Cited

U.S. PATENT DOCUMENTS

| | | | |
|---|---|---|---|
| 7,480,497 B2 | 1/2009 | Biswas et al. | |
| 2003/0054828 A1* | 3/2003 | Dent | 455/450 |
| 2008/0049820 A1* | 2/2008 | Jia et al. | 375/227 |

FOREIGN PATENT DOCUMENTS

| | | |
|---|---|---|
| CN | 101127548 A1 | 2/2008 |
| CN | 101159467 | 4/2008 |
| GB | 2446439 A1 | 8/2008 |
| JP | 2006140882 | 6/2006 |

OTHER PUBLICATIONS

International Search Report and Written Opinion dated Mar. 18, 2010 for International Application No. PCT/US2009/001627, International Filing Date: Nov. 12, 2009 consisting of 9-pages.

(Continued)

*Primary Examiner* — Michael Neff
(74) *Attorney, Agent, or Firm* — Meyertons, Hood, Kivlin, Kowert & Goetzel, P.C.

(57) ABSTRACT

A method and system for wireless communication in a wireless communication network. The wireless communication network has a first mobile terminal and a second mobile terminal arranged in virtual multiple input, multiple output ("V-MIMO") communication with a base station. A first wireless communication uplink channel corresponding to the first mobile terminal is estimated. The estimate is based on a first reference symbol signal and the cancellation of interference from a second reference symbol signal received from the second mobile terminal. A second wireless communication uplink channel corresponding to the second mobile terminal is estimated. The estimate is based on the second reference symbol signal and the cancellation of interference from the first reference symbol signal received from the first mobile terminal. The estimated first wireless communication uplink channel is used to demodulate a first data signal received from the first wireless device, and the estimated second wireless communication uplink channel is used to demodulate a second data signal received from the second wireless device.

14 Claims, 10 Drawing Sheets

(56) References Cited

OTHER PUBLICATIONS

First Office Action and translation thereof in related Chinese Patent Application No. 200980154640.5, Jun. 5, 2013, pp. 1-18.

Office Action and translation thereof in Japanese Application No. 2011-535843, sent Jul. 3, 2013, pp. 1-7.

* cited by examiner

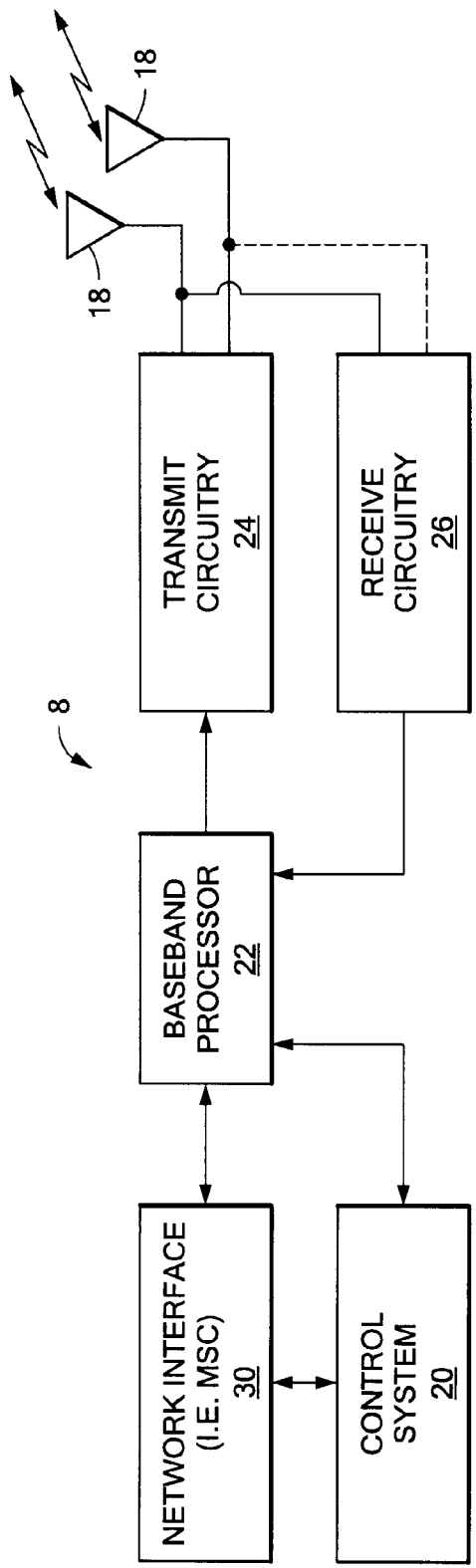
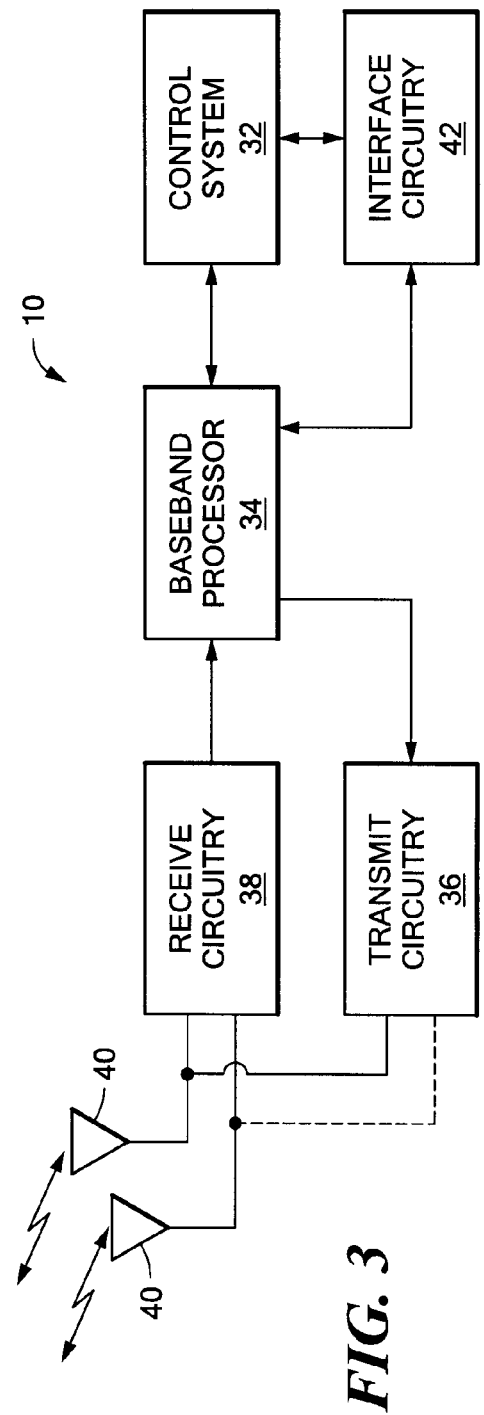
FIG. 2
FIG. 3

METHOD AND SYSTEM FOR REDUCED COMPLEXITY CHANNEL ESTIMATION AND INTERFERENCE CANCELLATION FOR V-MIMO DEMODULATION

CROSS-REFERENCE TO RELATED APPLICATIONS

This application is a Submission Under 35 U.S.C. §371 for U.S. National Stage Patent Application of International Application Number: PCT/CA2009/001627, filed Nov. 12, 2009 entitled "METHOD AND SYSTEM FOR REDUCED COMPLEXITY CHANNEL ESTIMATION AND INTERFERENCE CANCELLATION FOR V-MIMO DEMODULATION," which claims priority to U.S. Provisional Application Ser. No. 61/114,351, filed Nov. 13, 2008, the entirety of both which are incorporated herein by reference.

FIELD OF THE INVENTION

The present invention relates to wireless communications and in particular to a method and system for wireless communication channel estimation and interference cancellation used to demodulate virtual multiple input, multiple output ("V-MIMO") signals.

BACKGROUND OF THE INVENTION

Demand for high speed wireless communications is increasing at a fast pace. This is driven both by the sheer number of wireless communication terminals being activated as well as the increasing bandwidth demand. The latter is in turn driven by the increasing number of applications consuming the bandwidth, e.g., streaming multimedia, web browsing, GPS functionality, etc. As the computation capacity of the wireless communication terminals increases, so too do the terminals' ability to execute complex, bandwidth consuming applications.

Wireless communication networks, such as cellular networks, operate by sharing resources among the mobile terminals operating in the communication network. As part of the sharing process, resources relating to assigned channels, codes, etc. are allocated by one or more controlling devices within the system. Certain types of wireless communication networks, e.g., orthogonal frequency division multiplexed ("OFDM") networks, are used to support cell-based high speed services such as those under certain standards such as the 3rd Generation Partnership Project ("3GPP") e.g., Long Term Evolution ("LTE"), 3GPP2, e.g., Ultra-Mobile Broadband ("UMB") and the IEEE 802.16 broadband wireless standards. The IEEE 802.16 standards are often referred to as WiMAX or less commonly as WirelessMAN or the Air Interface Standard.

OFDM technology uses a channelized approach and divides a wireless communication channel into many sub-channels which can be used by multiple mobile terminals at the same time. These sub-channels and hence the mobile terminals can be subject to interference from adjacent cells and other mobile terminals because neighboring base stations and mobile terminals can use the same time and frequency resource blocks. The result is that spectral efficiency is reduced, thereby reducing both communication throughput as well as the quantity of mobile terminals that can be supported in the network.

This problem is further exacerbated in multiple input, multiple output ("MIMO") environments. Multiple Input, Multiple Output Orthogonal Frequency Division Multiplexing ("MIMO-OFDM") is an OFDM technology that uses multiple antennas to transmit and receive radio signals. MIMO-OFDM allows service providers to deploy wireless broadband systems that take advantage of the multi-path properties of environments using base station antennas that do not necessarily have line of sight communications with the mobile terminal.

MIMO systems use multiple transmit and receive antennas to simultaneously transmit data, in small pieces to the receiver, which processes the separate data transmissions and puts them back together. This process, called spatial multiplexing, can be used to proportionally boost the data-transmission speed by a factor equal to the smaller of the number of transmitting and receiving antennas. In addition, since all data is transmitted both in the same frequency band and with separate spatial signatures, this technique utilizes spectrum very efficiently.

MIMO operation implements a channel matrix (N×M) where N is the number of transmit antennas and M is the number of receive antennas to define the coding and modulation matrix for the wireless communication channel as a whole. The less correlated each column in the matrix is, the less interference experienced in each channel (as a result of the multiple antennas). In the case where there is a totally uncorrelated arrangement, i.e., the dot product between columns is zero, the channels are considered orthogonal to one another. Orthogonality provides the least antenna-to-antenna interference, thereby maximizing channel capacity, and data rate due to the higher post-processing signal to interference and noise ratio ("PP-SINR"). PP-SINR is the SINR after the MIMO decoding stage.

Virtual MIMO ("V-MIMO"), also referred to as Multi-User MIMO ("MU-MIMO") implements the MIMO technique described above by using multiple simultaneously transmitting mobile terminals each having one or more antennas. The serving base station includes multiple antennas. Although the base station can treat virtual MIMO operation as traditional MIMO in which a single mobile terminal has multiple antennas and can separate and decode the transmissions from the multiple simultaneously transmitting mobile terminals, channel correlation among mobile terminals as discussed above results in channel capacity loss due to inter-mobile terminal interference.

Because wireless communication channels are subject to interference and distortion, techniques have been developed to estimate certain properties of the channel so that the receiver, e.g., base station, can take these properties into account when decoding the received data. For example, multipath distortion and fading can alter the amplitude and phase of the transmitted wireless signal. The result is that, if the wireless communication channel is not accurately estimated, the decoded data will likely be improperly decoded. For example, a 16QAM or 64QAM (quadrature amplitude modulation) signal modulates a plurality of bits. Decoding of those bits is based on the amplitude and phase of the received signal as applied to a modulation constellation. If the amplitude and/or phase of the transmitted signal changes by the time it is received at the receiver, the mapping to the constellation will be errant, resulting in improper decoding. If the channel can be estimated by the receiver, the changes in amplitude and phase can be considered by the receiver during the mapping and decoding process.

The problem is made even more complex in V-MIMO environments. V-MIMO relies on spatial multiplexing. In order to properly recover the signal, the receiver also must decorrelate the signals and remove interference. These tasks have traditionally been done in the time domain. These tasks are quite processing and time intensive when 2, 4 or more mobile terminals are part of the V-MIMO arrangement. The result is that the cost of equipment at the receiver becomes exorbitant, if it even can be implemented all.

Also, while techniques for channel estimation based on least squares algorithms are known, these techniques are insufficient for V-MIMO implementations, such as where two or more mobile terminal signals are superimposed in a set of resource blocks. Even the use of known minimum mean square error ("MMSE") techniques fall short for V-MIMO applications.

Therefore what is needed is a cost effective, scalable and processing efficient system and method for estimating a wireless communication channel and cancelling interference that can be used in a V-MIMO environment such as on the base station uplink receiver in an LTE network.

SUMMARY OF THE INVENTION

The present invention advantageously provides a method and system for demodulating uplink data (from mobile terminal to base station) in a virtual multiple input, multiple output ("V-MIMO") wireless communication network. Reference symbol signals are used to estimate the wireless channels and the mutual interference between multiple mobile terminal or base station transmissions by using the estimates to cancel interference from the other mobile terminals or base stations participating in the V-MIMO session. These estimates are then used to demodulate the uplink user, i.e., mobile device, data signals. Error, e.g., CRC, checking is performed on the demodulated user data. In the case where the error checking from one of the mobile terminals fails and the error checking from the other mobile terminal passes (yielding valid user data), the correctly demodulated data from the passing mobile terminal is used to cancel the interference from the failing mobile terminal data signal. The user data signal is regenerated post-cancellation and the re-checked for errors.

In accordance with one aspect, the present invention provides a method for wireless communication in a wireless communication network in which the wireless communication network has a plurality of mobile terminals arranged in virtual multiple input, multiple output ("V-MIMO") communication with a base station. Of note, although the term V-MIMO is used herein to describe the present invention, it is understood that this term is not intended to limit the invention in any way and that this term as used herein is interchangeable with multi-user MIMO ("MU-MIMO") and co-operative MIMO. An uplink reference signal is received from each of the plurality of mobile terminals. A first reference signal channel estimate is determined for each of the plurality of mobile terminals based on the corresponding received reference signal. An interference cancelled estimate is received for each of the plurality of mobile terminals using the corresponding first reference signal channel estimate. A corresponding second reference signal channel estimate is determined for each of the plurality of mobile terminals based on the corresponding interference cancelled estimate.

In accordance with another aspect, the present invention provides a base station for use in wireless communication system in which the base station is capable of engaging in wireless communication with a plurality of mobile terminals arranged in virtual multiple input multiple output ("V-MIMO") communication with the base station. The base station receives an uplink reference signal from each of the plurality of mobile terminals, determines a first reference signal channel estimate for each of the plurality of mobile terminals based on the corresponding received reference signal, determines an interference cancelled estimate for each of the plurality of mobile terminals using the corresponding first reference signal channel estimate and determines a corresponding second reference signal channel estimate for each of the plurality of mobile terminals based on the corresponding interference cancelled estimate.

In accordance with yet another aspect, the present invention provides a method system for wireless communication in a wireless communication network. The wireless communication network has a first mobile terminal and a second mobile terminal arranged in virtual multiple input, multiple output ("V-MIMO") communication with a base station. A first wireless communication uplink channel corresponding to the first mobile terminal is estimated. The estimate is based on a first reference symbol signal received from the first mobile terminal and is based on a second reference symbol received from the second mobile terminal. The second reference symbol signal is used to estimate and cancel the interference of a third reference symbol signal received from the second mobile terminal from the first reference symbol signal. A second wireless communication uplink channel corresponding to the second mobile terminal is estimated. The estimate for the second wireless communication uplink channel is based on the third reference symbol signal received from the second mobile terminal and the cancellation of interference by the first reference symbol signal received from the first mobile terminal based on a fourth reference signal received from the first mobile terminal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a block diagram of an exemplary base station constructed in accordance with the principles of the present invention;

FIG. 3 is a block diagram of an exemplary mobile terminal constructed in accordance with the principles of the present invention;

DETAILED DESCRIPTION OF THE INVENTION

Figure 1:
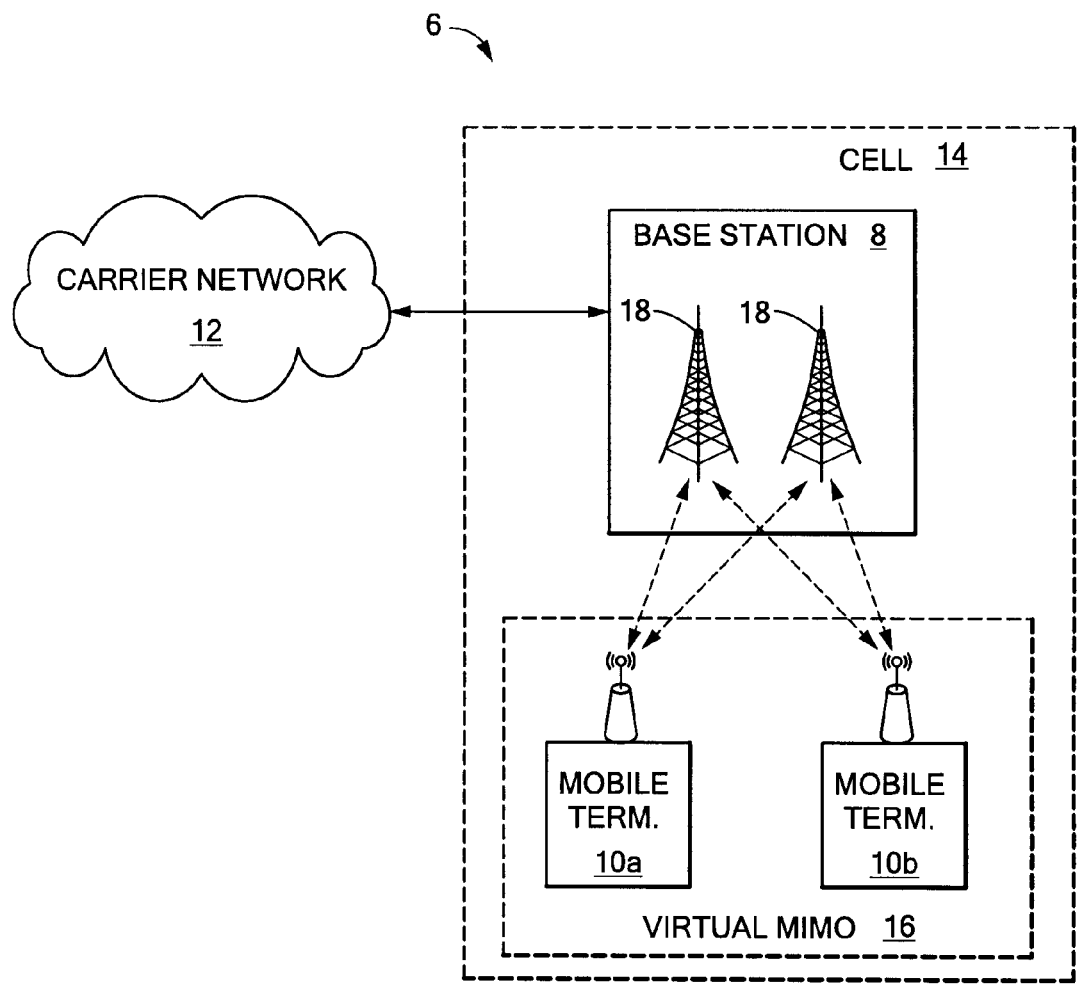
FIG. 1 is a diagram of an embodiment of a system constructed in accordance with the principles of the present invention.

As an initial matter, while certain embodiments are discussed in the context of wireless networks operating in accordance with the 3rd Generation Partnership Project ("3GPP") evolution, e.g., Long Term Evolution ("LTE") standard, etc., the invention is not limited in this regard and may be applicable to other broadband networks including those operating in accordance with other orthogonal frequency division multiplexing ("OFDM")-based systems including WiMAX (IEEE 802.16) and Ultra-Mobile Broadband ("UMB"), etc. Similarly, the present invention is not limited solely to OFDM-based systems and can be implemented in accordance with other system technologies, e.g., code division multiple access ("CDMA"), single carrier frequency division multiple access ("SC-FDMA"), etc.

Before describing in detail exemplary embodiments that are in accordance with the present invention, it is noted that the embodiments reside primarily in combinations of system components and processing steps related to improving wireless communication channel estimation and interference cancellation for virtual multiple input, multiple output ("V-MIMO") demodulation, such as in an LTE uplink receiver.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements, there is shown in FIG. 1, a system constructed in accordance with the principles of the present invention and designated generally as "6." System 6 includes one or more base stations 8 (known as eNodeB in LTE systems) and one or more mobile terminals 10 (shown as mobile terminals 10a and 10b in FIG. 1). Of note, although the term "base stations" is used herein, it is understood that these devices are referred to as "eNodeB" devices in LTE environments. Accordingly, the use of the term "base station" herein is not intended to limit the present invention to a particular technology implementation. Rather, the term "base station" is used for ease of understanding, it being intended to be interchangeable with the term "eNodeB" within the context of the present invention. Although not shown, mobile terminals 10 can communicate with base stations 8 via one or more relay nodes. Base stations 8 communicate with one another and with external networks, such as the Internet (not shown), via carrier network 12. Base stations 8 engage in wireless communication with mobile terminals 10 directly or via one or more relay nodes. Similarly, mobile terminals 10 engage in wireless communication with base stations 8 directly or via one or more relay nodes.

Base station 8 can be any base station arranged to wirelessly communicate with mobile terminals 10. Base stations 8 include the hardware and software used to implement the functions described herein to support V-MIMO uplink channel estimation and interference cancellation in accordance with the present invention. Base stations 8 include a central processing unit, transmitter, receiver, I/O devices and storage such as volatile and nonvolatile memory as may be needed to implement the functions described herein. Base stations 8 are described in additional detail below.

According to one embodiment, mobile terminals 10 may include a wide range of portable electronic devices, including but not limited to mobile phones, wireless data terminals, and similar devices, which use the various communication technologies such as LTE, advanced mobile phone system ("AMPS"), time division multiple access ("TDMA"), CDMA, global system for mobile communications ("GSM"), general packet radio service ("GPRS"), 1× evolution-data optimized (abbreviated as "EV-DO" or "1×EV-DO") and universal mobile telecommunications system ("UMTS"). Mobile terminals 10 also include the hardware and software suitable to support the functions used to engage in wireless V-MIMO communication with base station 8. Such hardware can include a receiver, transmitter, central processing unit, storage in the form of volatile and nonvolatile memory, input/output devices, etc.

Relay nodes (not shown) are optionally used to facilitate wireless communication between mobile terminal 10 and base station 8 in the uplink (mobile terminal 10 to base station 8) and/or the downlink (base station 8 to mobile terminal 10). A relay node configured in accordance with the principles of the present invention includes a central processing unit, storage in the form of volatile and/or nonvolatile memory, transmitter, receiver, input/output devices and the like. Relay nodes also include software to implement the MAC control functions described herein. Of note, the arrangement shown in FIG. 1 is general in nature and other specific communication embodiments constructed in accordance with the principles of the present invention are contemplated.

Although not shown, system 6 can include a base station controller ("BSC") that controls wireless communications within multiple cells, which are served by corresponding base stations ("BS") 8. It is understood that some implementations, such as LTE and WiMAX, do not make use of a BSC. In general, each base station 8 facilitates communications using V-MIMO OFDM with mobile terminals 10, which are illustrated as being within the geographic confines of the cell 14 associated with the corresponding base station. Movement of mobile terminals 10 in relation to the base stations 8 can result in significant fluctuation in channel conditions as a consequence of multipath distortion, terrain variation, reflection and/or interference caused by man-made objects (such as buildings and other structures), and so on.

Multiple mobile terminals 10 may be logically grouped together to form a V-MIMO group 16. Of note, although FIG. 1 shows two mobile terminals 10 grouped to form V-MIMO group 16, the invention is not limited to such. It is contemplated that more than two mobile terminals can exist in a V-MIMO group 16. It is also contemplated that a mobile terminal can have more than one antenna to operate using traditional MIMO for wireless communications as well as participate as part of a V-MIMO group 16. Even using diversity channels, where orthogonality-based scheduling is ineffective and mobile terminals 10 therefore interfere with each other, mobile terminals 10 can still be paired in accordance with the present invention to take advantage of the multi-user gain associated with MIMO wireless communication.

Base station 8 is also shown in FIG. 1 as including two antennas 18 to support V-MIMO operation. It is understood that the present invention is not limited to such and that base station 8 can include more than two antennas 18 or even a single antenna 18 in support of multiple mobile terminals 10. FIG. 1 shows each mobile terminal 10 engaged in wireless communication with each antenna 18 of base station 8. As is discussed below in detail, base station 8 includes receiver software and/or hardware to estimate the wireless channel using the minimum mean square error ("MMSE") approach discussed below in detail in accordance with the present invention. Base station 8 also includes receiver software and/or hardware to cancel interference on the V-MIMO uplink A high level overview of the mobile terminals 10 and base stations 8 of the present invention is provided prior to delving into the structural and functional details of the preferred embodiments. It is understood that relay nodes can incorporate those structural and functional aspects described herein with respect to base stations 8 and mobile terminals 10 as may be needed to perform the functions described herein.

With reference to FIG. 2, a base station 8 configured according to one embodiment of the present invention is illustrated. The base station 8 generally includes a control system 20, a baseband processor 22, transmit circuitry 24, receive circuitry 26, one or more antennas 18, and a network interface 30. The receive circuitry 26 receives radio frequency signals bearing information from one or more remote transmitters provided by mobile terminals 10 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireline or wireless network via the network interface 30 or transmitted to another mobile terminal 10 serviced by the base station 8.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 18 through a matching network (not shown). Modulation and processing details are described in greater detail below.

With reference to FIG. 3, a mobile terminal 10 configured according to one embodiment of the present invention is described. Similar to base station 8, a mobile terminal 10 constructed in accordance with the principles of the present invention includes a control system 32, a baseband processor 34, transmit circuitry 36, receive circuitry 38, one or more antennas 40, and user interface circuitry 42. The receive circuitry 38 receives radio frequency signals bearing information from one or more base stations 8. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which the baseband processor 34 encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform ("IDFT") and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 8 to the mobile terminals 10. Each base station 8 is equipped with n transmit antennas 18, and each mobile terminal 10 is equipped with one or more receive antennas 40, the total of which is referred to as m. Notably, the respective antennas can be used for reception and transmission using appropriate duplexers or switches and are so labeled only for clarity. FIG. 1 shows n=2 and m=2.

Figure 4:
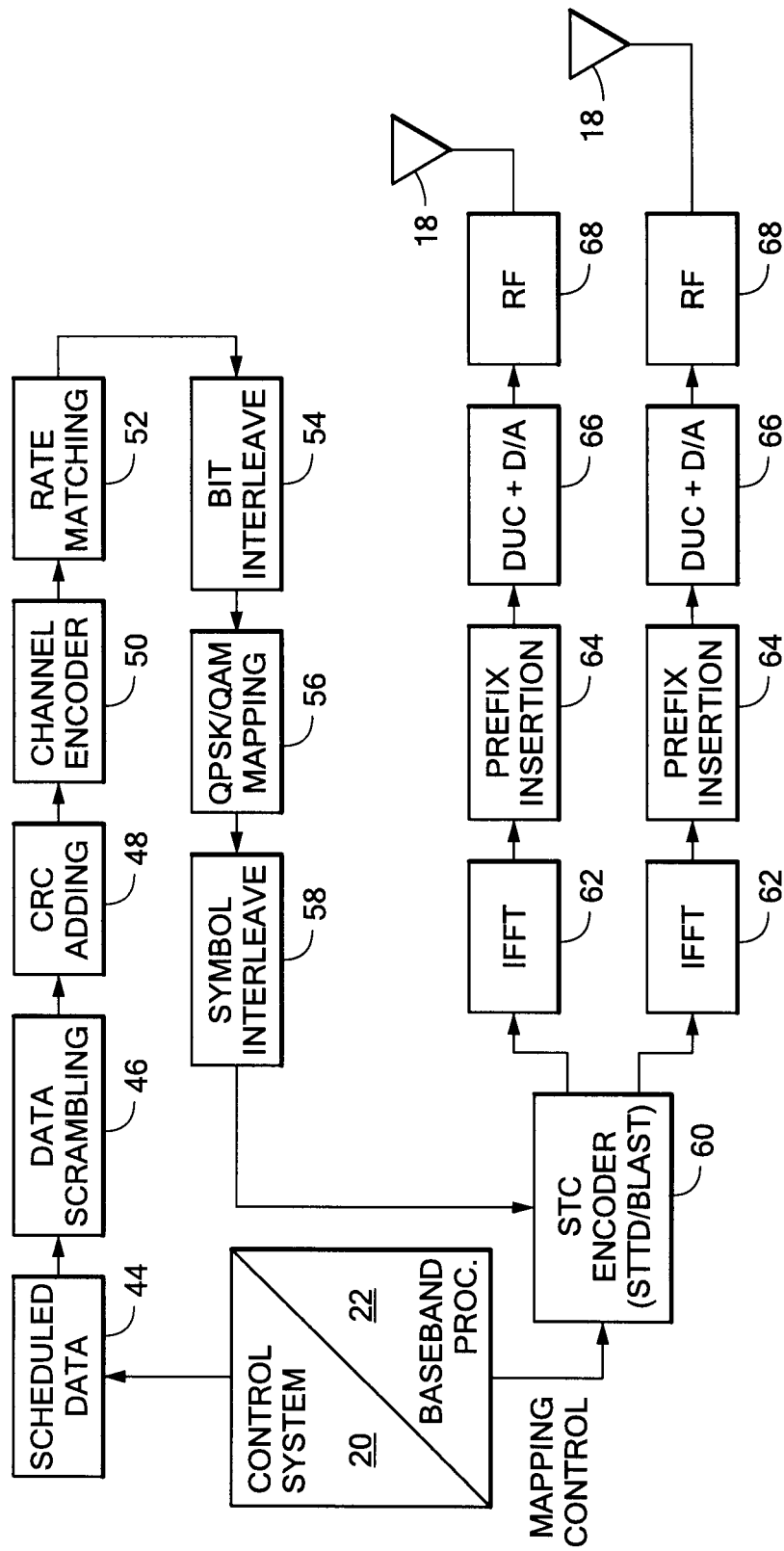
FIG. 4 is a block diagram of an exemplary OFDM architecture constructed in accordance with the principles of the present invention.

With reference to FIG. 4, a logical OFDM transmission architecture is described according to one embodiment. Initially, the base station controller sends data to be transmitted to various mobile terminals 10 to the base station 8. The base station 8 may use the channel quality indicators ("CQIs") associated with the mobile terminals to schedule the data for transmission as well as select appropriate coding and modulation for transmitting the scheduled data. The CQIs may be provided directly by the mobile terminals 10 or determined at the base station 8 based on information provided by the mobile terminals 10. In either case, the CQI for each mobile terminal 10 is a function of the degree to which the channel amplitude (or response) varies across the OFDM frequency band and the strength of the transmitted signal.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile terminal 10. Again, the channel coding for a particular mobile terminal 10 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion making the transmitted signals more resistant to interference and more readily decoded at a mobile terminal 10. The STC encoder logic 60 will process the incoming symbols and provide n outputs corresponding to the number of transmit antennas 18 for the base station 8. The control system 20 and/or baseband processor 22 will provide a mapping control signal to control STC encoding. At this point, assume the symbols for the n outputs are representative of the data to be transmitted and capable of being recovered by the mobile terminal 10.

For the present example, assume the base station 8 has two antennas 18 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. It is further envisioned that processing functionality can likewise be consolidated into a lesser number of processors than referenced herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 18. Notably, pilot signals known by the intended mobile terminals 10 are scattered among the sub-carriers. The mobile terminals 10, which are discussed in detail below, will use the pilot signals for channel estimation.

Figure 5:
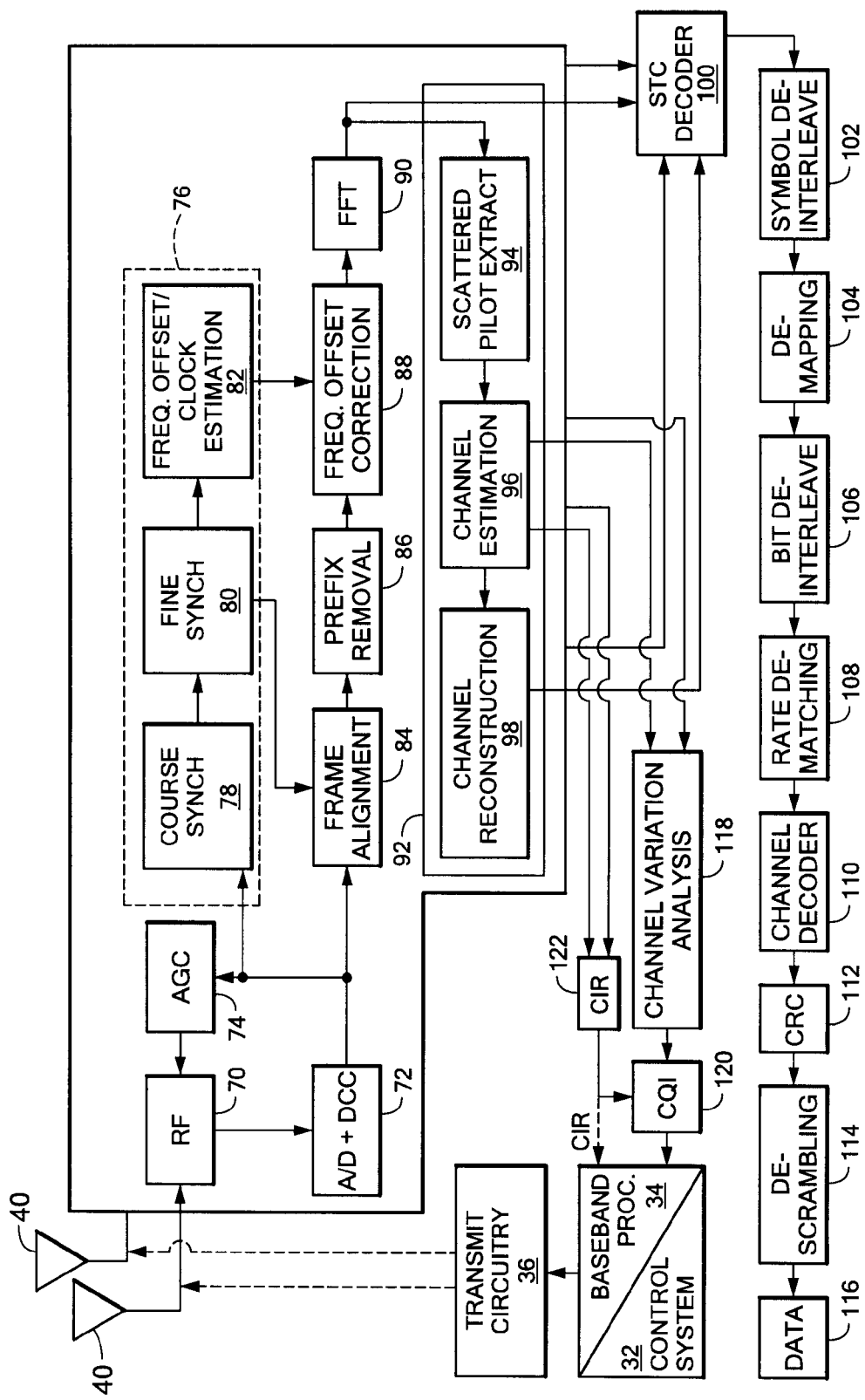
FIG. 5 is a block diagram of the flow of received signal processing in accordance with the principles of the present invention.

Reference is now made to FIG. 5 to illustrate reception of the transmitted signals by a mobile terminal 10. Upon arrival of the transmitted signals at each of the antennas 40 of the mobile terminal 10, the respective signals are demodulated and amplified by corresponding RF circuitry 70. For the sake of conciseness and clarity, only one of the receive paths is described and illustrated in detail, it being understood that a receive path exists for each antenna 40. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
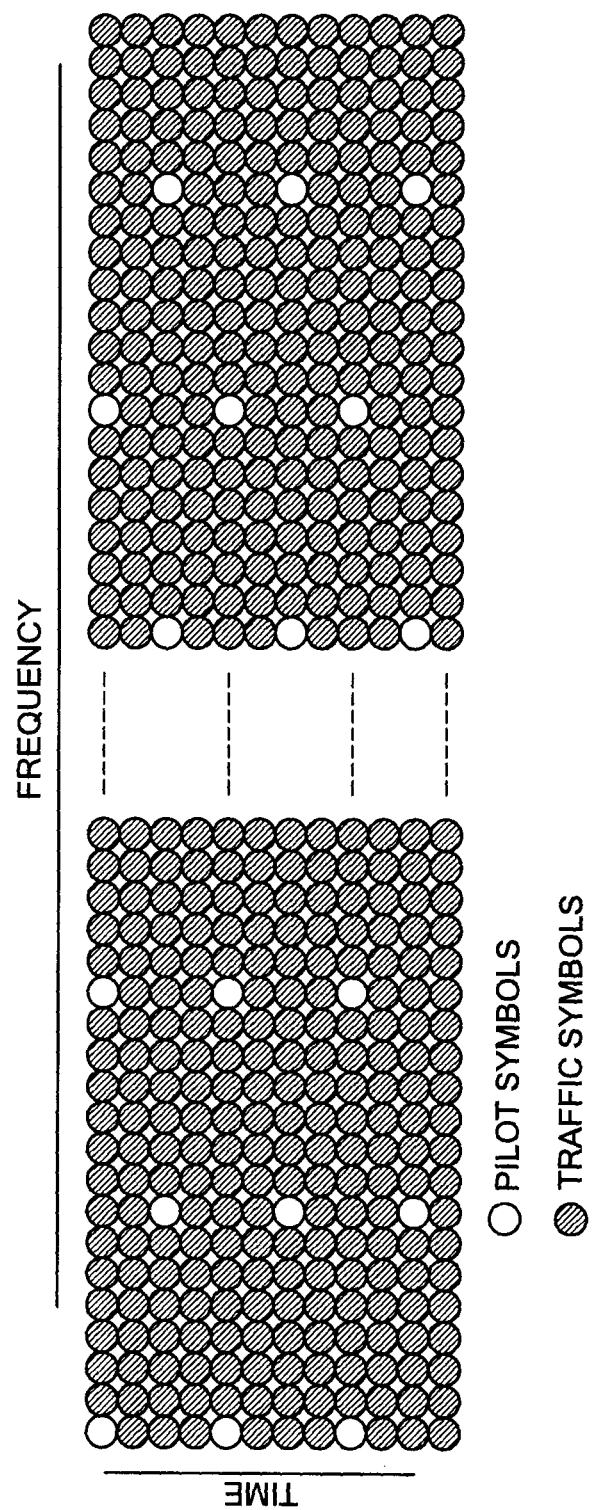
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Although FIGS. 4 and 5 are shown and described with respect to communication from base station 8 to mobile terminal 10, it is understood that the same concepts apply to uplink communications from mobile terminal 10 to base station 8.

The present invention provides a two part solution to the aforementioned problems regarding channel estimation and demodulation. The first aspect provides a reduced complexity minimum mean squared error ("MMSE") channel estimation which allows reference signal ("RS") channel estimation of V-MIMO mobile terminals 10. The second aspect provides for demodulation of the data segments of the V-MIMO mobile terminals 10. Frequency domain data signal interference regeneration and cancellation is used for the weaker mobile terminal 10 signal in the V-MIMO.

Although described below in detail, the channel estimation is performed using mutual interference cancellation from the uplink reference signal that is jointly shared by mobile terminals 10 in the V-MIMO. This is accomplished using sounding reference signal ("SRS") based channel estimates. A reduced complexity MMSE method is used for RS channel estimation. With respect to data demodulation and in particular the data signal demodulation of the weaker mobile terminal 10 in the V-MIMO, the successfully decoded stronger mobile terminal 10 data signal is canceled from the weaker mobile terminal 10 signal and the weaker signal regenerated. This arrangement provides V-MIMO channel estimation and demodulation performance comparable to other channel estimation techniques, but advantageously does so at one quarter of the computational complexity. In other words, the present invention advantageously reduces the data demodulation complexity by a factor of 4 compared with other demodulation methods.

The reduced complexity MMSE RS channel estimation method suitable for use in V-MIMO RS channel estimation is described. In accordance with this aspect of the present invention an uplink reference signal is received from each mobile terminal 10. Using the received uplink referenced signals, a first reference signal channel estimate for each of the mobile terminals 10 is determined. For example, such a first reference signal can be a sounding reference signal ("SRS"). The SRS for each mobile terminal can be used to determine an interference cancellation estimate for each mobile terminal 10. With the interference cancellation estimate having been determined, a second reference signal channel estimate can be determined for each of the mobile terminals 10. For example, this second reference signal channel estimate can be an MMSE channel estimate.

Of note, although the present invention is described in FIGS. 7-10 with reference to two mobile terminals 10, e.g., mobile terminal 10a and mobile terminal 10b, it is understood that the use of two mobile terminals is for ease of explanation and understanding only, the V-MIMO used in actual operation need not be limited to two mobile terminals 10.

The reduced complexity MMSE RS channel estimation method suitable for use in V-MIMO RS channel estimation is described with reference to FIG. 7. Initially, base station 8 receives a composite signal on the physical uplink shared channel ("PUSCH") from the plurality of mobile terminals 10. The signal contains the received PUSCH demodulation reference symbol ("DMRS") signal. A 1024-point Fast Fourier Transform ("FFT") is performed on the reference signal by base station 8 and the gain normalized (step S100). After the FFT, and in the case of a two mobile terminal 10 V-MIMO, the signal can be described as $y = \chi_1 h_1 + \chi_2 h_2 + n$. From the resulting frequency domain signal, the resource blocks ("RB") can be isolated in the V-MIMO. The signal y is then normalized in step S100. With respect to this equation (y), $\chi_1$ and $\chi_2$ refer to the demodulation reference signal vectors for mobile terminal 10a and mobile terminal 10b, respectively. $h_1$ and $h_2$ refer to the frequency domain complex channel response vectors of mobile terminal 10a and mobile terminal 10b, respectively, and n is the additive white Gaussian noise with a variance $\sigma_n^2$.

Because the reference symbol sequences of mobile terminals 10a and 10b are known to the base station 8 receiver (by virtue of being "reference signals"), the buffered sounding reference signals ("SRS") based channel estimates for the two mobile terminals 10 in the V-MIMO can be determined (steps S102 and steps S104, respectively). These estimates are referred to herein as $\{\hat{h}_1\}$ and $\{\hat{h}_2\}$, respectively.

The demodulation reference signal ("DMRS") for mobile terminals 10a (step S106) and mobile terminal 10b (step S108), which as discussed are known to base station 8 are used along with the SRS estimates to regenerate an estimate of the received DMRS signal $\{X_1 \hat{h}_1\}$ for mobile terminal 10a (step S110) and an estimate of the DMRS signal $\{X_2 \hat{h}_2\}$ for mobile terminal 10b (step S112).

Regarding mobile terminal 10a, equation $\{X_1 h_1\}$ is subtracted from (y) (step S114) to create the interference canceled estimate of the DMRS signal received from mobile terminal 10b given by:

$$y_{u1\_canceled} = y - X_1 \hat{h}_1.$$

The RS gain is normalized for the RS signal corresponding to mobile terminal 10b (step S116) and a least squared ("LS") estimation is performed for mobile terminal 10b (step S118) in which the LS channel estimate for mobile terminal 10b is given by:

$$\hat{H}_{LS2} = X_2^{-1} y_{u1\_canceled}.$$

A similar process is performed with respect to mobile terminal 10a. The regenerated signal for mobile terminal 10b given by $$\{X_2 \hat{h}_2\}$$

is subtracted from (y) (step S120) to provide an interference canceled estimate of the DMRS signal received from mobile terminal 10a, given by the equation $$y_{u2\_canceled} = y - X_2 \hat{h}_2.$$

The reference signal gain for mobile terminal 10a is normalized (step S122) and estimation for mobile terminal 10a is determined (step S124). This determination is represented by:

$$\hat{H}_{LS1} = X_1^{-1} y_{u2\_canceled}$$

With the LS channel estimates having been determined, these LS estimates can be used to determine the reduced complexity MMSE channel response to extract the DMRS channel response estimates for mobile terminals 10a and 10b. With respect to mobile terminal 10a, the signal to noise ratio ("SNR"), the β, and the resource block ("RB") length are used to generate a correlation matrix (step S126). Channel response estimation for mobile terminal 10a is determined using an MMSE method (step S128). An exemplary MMSE method for step S128 is given by the following equation:

$$\hat{H}_{red\_cmplx\_U1} = R_{HH}\left(R_{HH} + \frac{\beta}{SNR_1}I\right)^{-1} \hat{H}_{LS1}.$$

With respect to mobile terminal 10b, a correlation matrix is determined for mobile terminal 10b (step S130) using the SNR of mobile terminal 10b, the β for mobile terminal 10b and the resource block length. The MMSE channel response estimate for mobile terminal 10b is determined using the LS estimation from step S118 and the MMSE correlation matrix from step S130 (step S132). An exemplary MMSE method for step S132 is given by the following equation:

$$\hat{H}_{red\_cmplx\_U2} = R_{HH}\left(R_{HH} + \frac{\beta}{SNR_2}I\right)^{-1} \hat{H}_{LS2}$$

Figure 7:
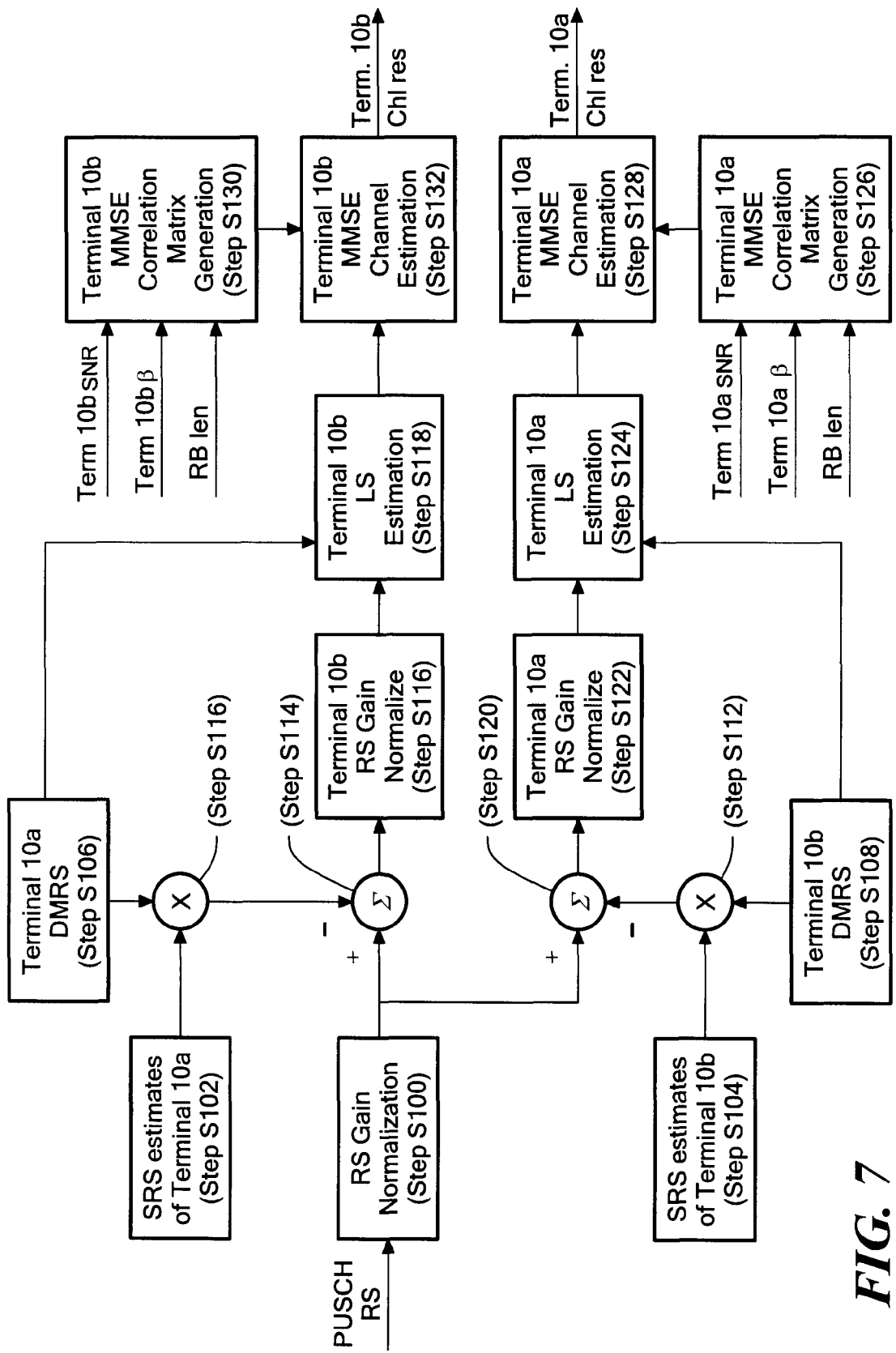
FIG. 7 is a block diagram of an exemplary channel estimation process of the present invention.

The result of the process shown and described with reference to FIG. 7 provides uplink channel estimation for mobile terminals 10 involved in V-MIMO communication with base station 8. This is done using best effort processing to create the effect of mobile terminal 10a RS signal on mobile terminal 10b and vice versa. Because base station 8 has advance information and knowledge of the RS sequences of mobile terminals 10a and 10b, the use of frequency domain channel estimates for mobile terminals 10a and 10b can be used by base station 8 to approximately generate each mobile terminal signal which is canceled prior to LS estimates of the other user is determined. As discussed above, the present invention proposes using SRS estimates. Mobile terminals in idle mode and traffic mode periodically transmit these SRS signals. Therefore, it is possible to use the SRS base channel estimates for regeneration as discussed above. For low mobility devices, e.g., mobile terminals traveling at less than 60 km/hr, the previous SRS based channel estimates are sufficiently accurate to generate the approximate interference experienced from a mobile terminal 10 with respect to the other mobile terminals 10.

With the channel response estimates in hand, these estimates can be used by base station 10 to demodulate and extract actual uplink data received from mobile terminals 10a and 10b. The data demodulation/extraction process is discussed with reference to FIGS. 8a, 8b, 9 and 10.

Figure 8A:
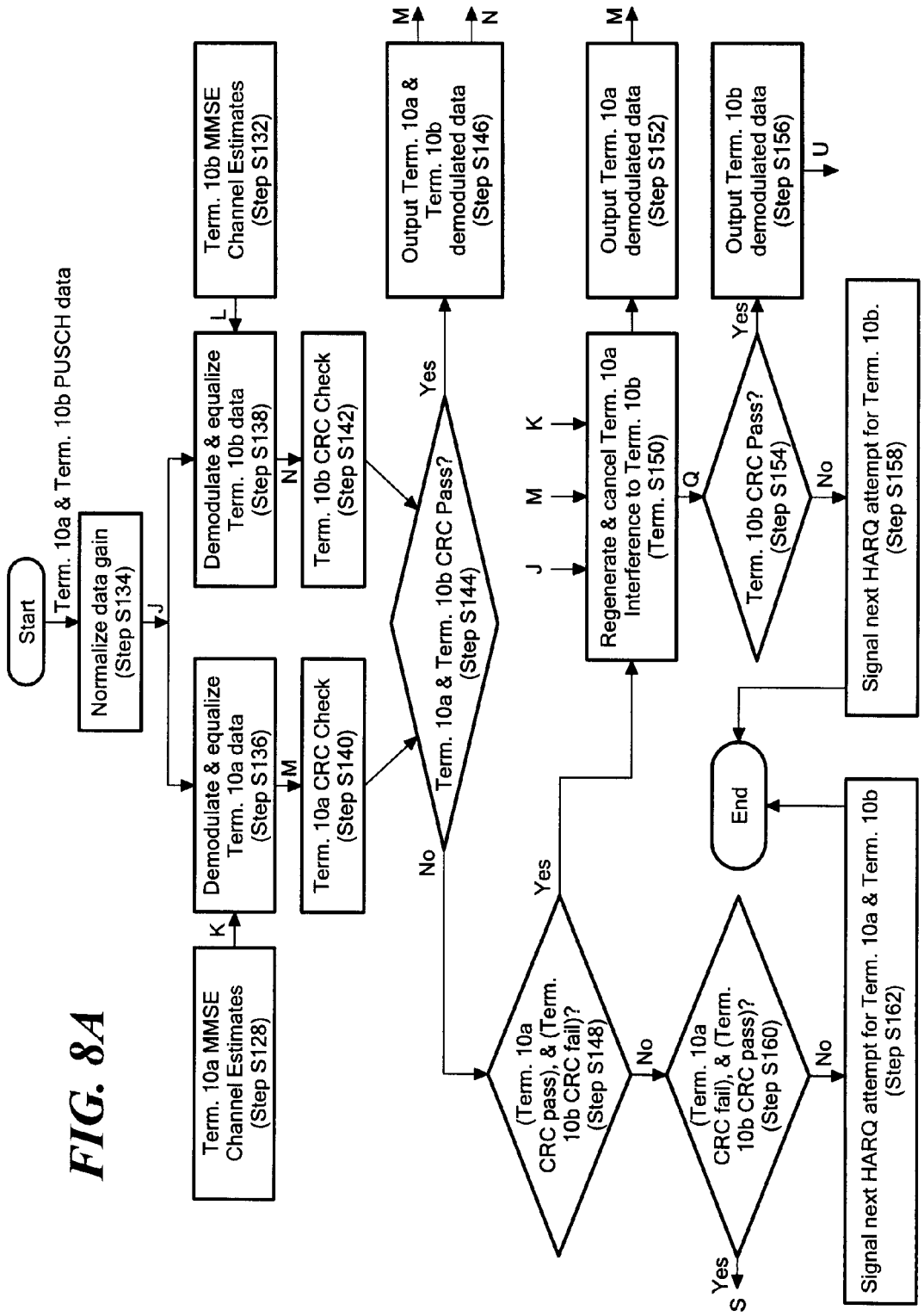
FIGS. 8A and 8B are a flow chart of an exemplary uplink data demodulation and interference cancellation process of the present invention.

Initially base station 8 receives a PUSCH data signal from mobile terminals 10a and 10b. Base station 8 normalizes the data gain (step S134) and the user data signals from mobile terminals 10a and 10b are demodulated and equalized using the MMSE channel estimates from steps S128 and S132 from FIG. 7 (steps S136 and S138, respectively). Once equalized and demodulated, the resultant data is checked for errors, such as using a cyclic redundancy check ("CRC"). This is shown in FIG. 8a as step S140 for mobile terminal 10a and step S142 for mobile terminal 10b. The CRC's are then evaluated (step S144). If the CRCs for both mobile terminal 10a and mobile terminal 10b pass, the demodulated data for mobile terminals 10a and 10b are considered to have been properly demodulated and the user data are output by the process and used by base station 8 as V-MIMO mobile terminal data (step S146). As shown in FIG. 8a output M refers to the demodulated data from mobile terminal 10a in step S136 and output N corresponds to the demodulated data for mobile terminal 10b from step S138.

If the CRC for mobile terminal 10a passes and the CRC for mobile terminal 10b fails (step S148), the data estimates and channel estimates of mobile terminal 10a are used to regenerate and cancel its interference from mobile terminal 10b (step S150). Step S150 is discussed in detail below. Because the CRC with respect to mobile terminal 10a in step S148 passed, the user data corresponding to mobile terminal 10a is valid and the demodulated data for mobile terminal 10a is output by the inventive process for use by base station 8 (step S152). This output is shown as output M. The CRC for the mobile terminal 10b user data is checked again after the interference cancellation and data signal regeneration are applied to the signal for mobile terminal 10b (step S154). If the CRC for mobile terminal 10b passes, the demodulated data corresponding to mobile terminal 10b is considered properly demodulated and valid and is output by the process for use by base station 8 (step S156). The demodulated data for output mobile terminal 10b is shown in FIG. 8a as data U. If the CRC for mobile terminal 10b does not pass (step S154), the next HARQ attempt for mobile terminal 10b is transmitted by base station 8 (step S158).

The case where step S148 fails, e.g., mobile terminal 10a does not pass its CRC or mobile terminal 10b fails its CRC, a determination is made as to whether the CRC for mobile terminal 10a fails and the CRC mobile for terminal 10b passes (step S160).

In the case where the CRC has not failed for mobile terminal 10a or the CRC terminal 10b does not pass, e.g. where the CRC's have failed for both mobile terminal 10a and mobile terminal 10b, the base station 8 signals the next HARQ attempt for both mobile terminal 10a and mobile terminal 10b (step S162).

Figure 8B:
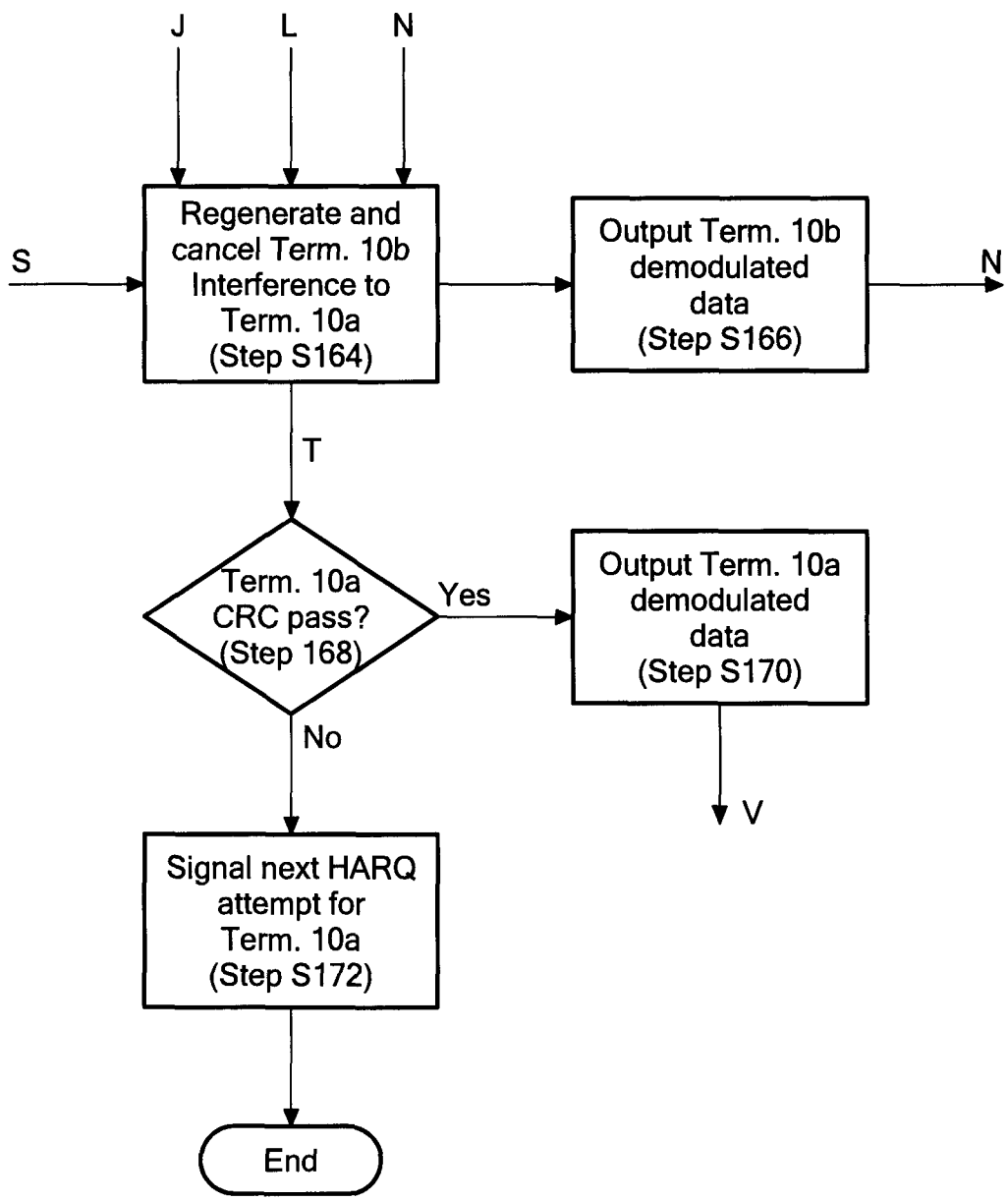

In the case where the CRC fails for mobile terminal 10a and passes for mobile terminal 10b (step S160), the process of the present invention continues on FIG. 8b where the data signal and channel estimates for mobile terminal 10b are used to regenerate and cancel its interference from the mobile terminal 10a signal (step S164). Step S164 is discussed in detail below. Because the CRC corresponding to the data received from mobile device 10b is valid, the corresponding data is valid and the process outputs the demodulated data wireless terminal 10b for V-MIMO use by base station 8 (step S166). This is shown as output N in FIG. 8B.

CRC for mobile terminal 10a is checked again after the regeneration and interference cancellation (step S168). If the CRC for mobile terminal 10a passes, valid data received from mobile terminal 10a is indicated and the process outputs the demodulated data (step S170) for use by base station 8 to further process the V-MIMO data. The demodulated data output at step S170 is shown as data V. In the case where the CRC from mobile terminal 10a does not pass (step S168), base station 8 signals the next HARQ attempt for mobile terminal 10a (step S172) and the process ends.

Figure 9:
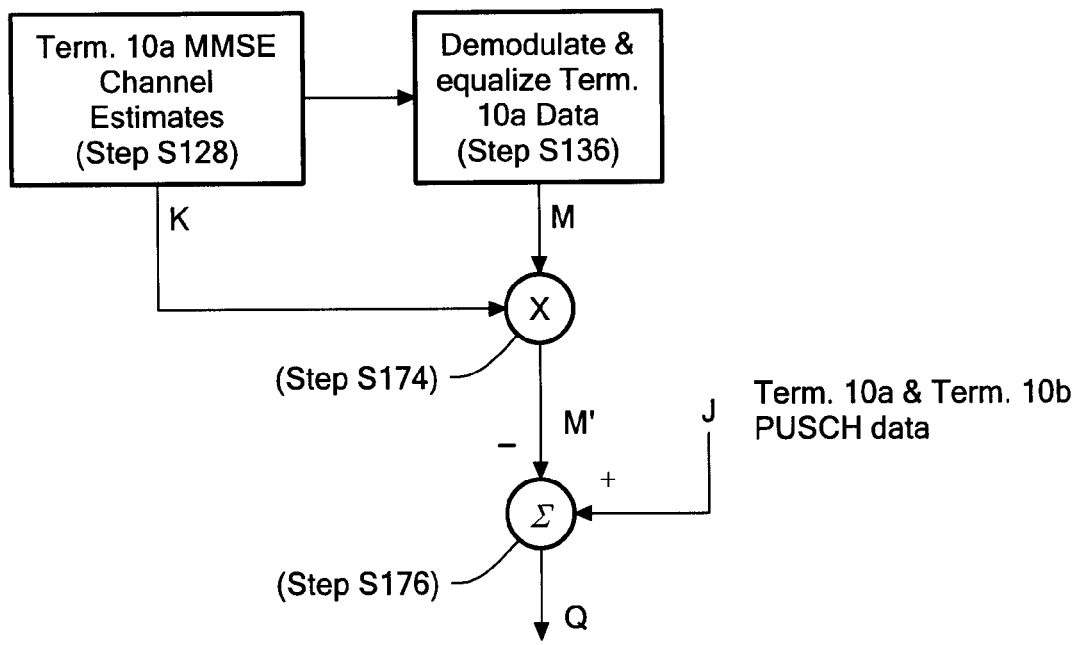
FIG. 9 is a flow chart detailing the regeneration and the first mobile terminal to second mobile terminal interference cancellation process of FIGS. 8A and 8B.

Regeneration and interference cancellation of mobile terminal 10a with respect to mobile 10b of step S150 is described with reference to FIG. 9. The MMSE channel estimates for mobile device 10a (step S128) is multiplied with the successfully demodulated data for mobile device 10a (step S136), the resultant output of which is shown as the value M' (step S174). M' is then subtracted from the PUSCH data for mobile terminals 10a and 10b (step S176). The result is the interference cancelled and regenerated data signal for mobile terminal 10b, shown as output Q.

Figure 10:
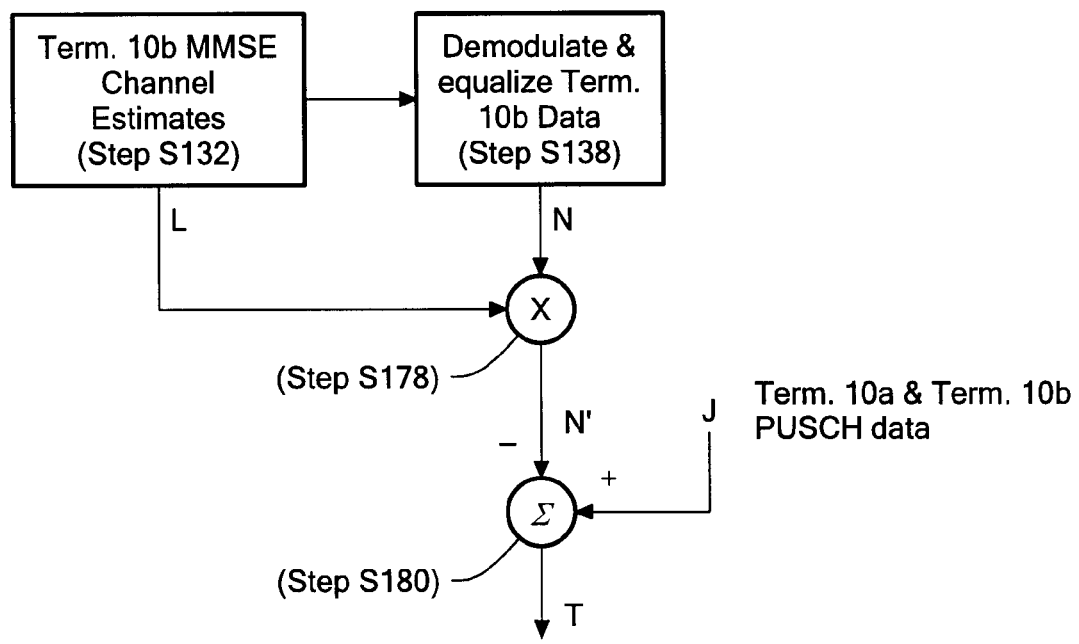
FIG. 10 is a flow chart detailing the regeneration and the second mobile terminal to first mobile terminal interference cancellation process of FIGS. 8A and 8B.

The regeneration and cancellation of interference corresponding to mobile terminal 10b with respect to mobile terminal 10a of step S164 is described and discussed in detail with reference to FIG. 10. To remove the interference of mobile device 10b from the data corresponding to mobile device 10a, the MMSE channel estimates for mobile terminal 10b from step S132 are multiplied with the successfully demodulated data for mobile device 10b from step S138 to form an estimate of the channel output based on mobile device 10b (step S178). The resultant output is shown as N'. Of note, N' (as well as M') are based on the equation discussed above given by:

$$y = \chi_1 h_1 + \chi_2 h_2 + n$$

The estimate derived as N' is subtracted from the PUSCH data for mobile terminal 10a and mobile terminal 10b (step S180) to produce an estimate of the signal received from mobile device 10a (step S180). The result is the interference cancelled and regenerated data signal for mobile terminal 10a, shown as output T.

Figure 11:
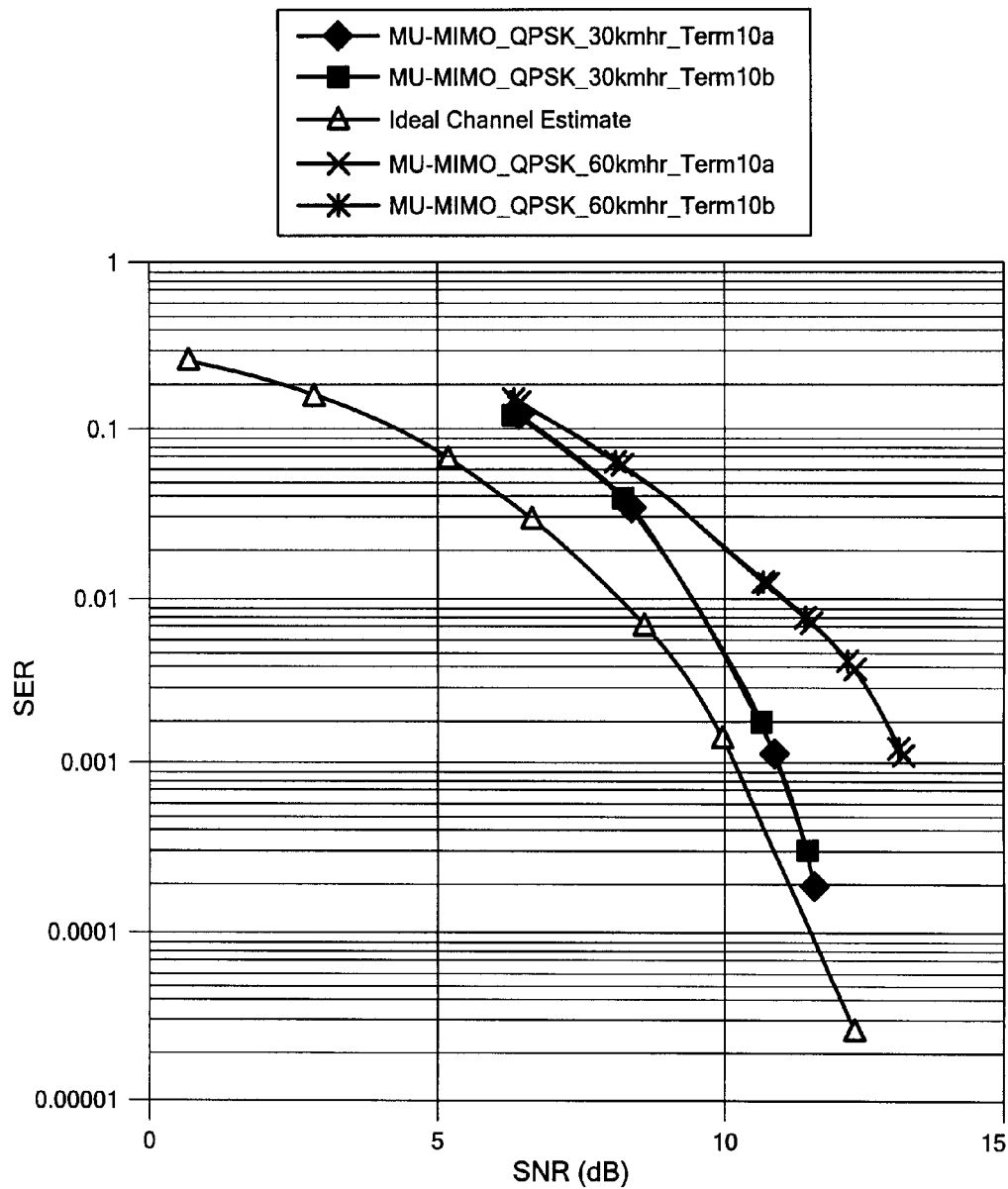
FIG. 11 is a graph of signal to noise ratio vs. symbol error rate for a number of exemplary wireless uplink communications processes.

FIG. 11 shows the relationship between symbol error rate and SNR for mobile terminal 10a and 10b using quadrature phase-shift keying ("QPSK") for mobile terminals 10 traveling at 30 km/hr and 60 km/hr. These relationships are shown with reference to the ideal channel. The ideal channel estimate shown and described with reference to FIG. 11 is defined as having perfect knowledge of the channel, i.e., that there is no error in the estimate.

As is shown in FIG. 11 mobile terminals 10 traveling at 30 km/hr yield symbol error rate versus SNR curves that are less than an order of magnitude from the ideal estimate at low SNRs and approach the ideal estimate as the SNR increases. For the faster traveling mobile terminals, the curve follows a similar path but does diverge somewhat at higher SNRs.

Of note, the graph shown in FIG. 11 is the result of a simulation assuming SRSs are transmitted once every one or two milliseconds. This helps to provide SNR based channel estimates that can be reliably used for the mutual interference cancellation in the RS signals for the mobile terminals in the V-MIMO. The simulation also assumed that one mobile terminal signal is sufficiently stronger compared with the other mobile terminal signal so that the stronger mobile terminal signal data can be reliably demodulated. This also allows the stronger mobile terminal interference to be accurately regenerated and canceled from the weaker signal and so that the interference canceled weak signal can be demodulated. It is also assumed that the base station 8 uses a single antenna. It is contemplated that in an embodiment using two antennas at base station 8, turbo coding and interleaving, an additional 10 dB of approximate performance gain is expected for a given error rate versus SNR curve.

The present invention advantageously provides a method and system which allows channel estimation for V-MIMO mobile terminals to be determined in a non-computationally complex manner and also allows these channel estimates to be used to regenerate and recover mobile device uplink data through the interference cancellation and regeneration process discussed above.

In implementing the present invention, it is preferable to have a high SNR mobile terminal 10 and another mobile terminal 10 with a low signal to noise ratio ("SNR"). In such case, it is likely that the high SNR mobile terminal 10 will pass its CRC, thereby providing a good source to use for the channel estimate. Pairing the high SNR and low SNR mobile terminals 10 can be done using power control. In other words, the performance of the present invention can be enhanced by pairing up mobile terminals 10 in the V-MIMO using power control to pair up a high SNR mobile terminal 10 with a low SNR mobile terminal 10.

There are a number of other aspects of the present invention that can be implemented to further enhance performance. For example, accommodations of modulation coding sets ("MCS") can be reserved for use only in V-MIMO cases. Also, in the case where the first HARQ attempt fails, subsequent HARQ attempts may be paired with other mobile terminals 10 (as compared with the mobile terminals 10 in the current V-MIMO set). It is also contemplated that uplink power control parameters of the mobile terminals 10 can be set to ensure that there is approximately a 5-10 dB difference in their received signals. Control parameters in this case would refer to base station 8 received signal power Po and path loss compensation factor α. It is further contemplated that V-MIMO operation can be considered only in cases where all physical resource blocks ("PRB") are in use and there is an incoming traffic request.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A method for wireless communication in a wireless communication network, the wireless communication network having a plurality of mobile terminals arranged in virtual multiple input, multiple output ("V-MIMO") communication with a base station, the method comprising:
   receiving an uplink reference signal from each of the plurality of mobile terminals;
   determining a first reference signal channel estimate for each of the plurality of mobile terminals based on the corresponding received reference signal;
   determining an interference cancelled estimate for each of the plurality of mobile terminals using the corresponding first reference signal channel estimate;
   determining a corresponding second reference signal channel estimate for each of the plurality of mobile terminals based on the corresponding interference cancelled estimate;
   for each of the plurality of mobile terminals, demodulating a user data signal received from the mobile terminals using the second reference channel estimate corresponding to the mobile terminal; and
   performing a first error checking of the demodulated user data for each of the plurality of mobile terminals.

2. The method according to claim 1, wherein each second reference signal channel estimate is determined using a minimum mean square error method.

3. The method according to claim 2, wherein each second reference signal channel estimate is determined in a frequency domain.

4. The method according to claim 1, further comprising, in a case where there are no errors in the demodulated user data for the plurality of the mobile terminals:
   determining that the demodulated user data from the plurality of the mobile terminals are valid; and
   processing the demodulated user data as V-MIMO data.

5. The method according to claim 1, further comprising, in a case where the first error checking of the demodulated data for one of the plurality of mobile terminals yields a failure:
   using the demodulated user data and the second reference signal channel estimate corresponding to at least one of the mobile terminals other than the mobile terminal yielding the failed first error checking to:
      cancel the interference from the signal corresponding to the mobile terminal yielding the first failed error checking; and
      regenerate the user data signal for the mobile terminal yielding the first failed error checking.

6. The method according to claim 5, wherein cancelling the interference from the signal corresponding to the mobile terminal yielding the first failed error checking includes:
   (a) multiplying the second reference signal channel estimate corresponding to at least one of the mobile terminals passing the error checking by the demodulated user data corresponding to the same at least one of the mobile terminals passing the error checking; and
   (b) subtracting the multiplication result of step (a) from a received composite signal of the plurality of mobile terminals.

7. The method according to claim 5, further comprising performing a second error checking on the regenerated data signal.

8. The method according to claim 7, further comprising signaling a next hybrid automatic repeat request ("HARQ") if the second error checking yields a failure.

9. A base station for use in a wireless communication system, the base station capable of engaging in wireless communication with a plurality of mobile terminals arranged in virtual multiple input multiple output ("V-MIMO") communication with the base station, the base station arranged to:
   receive an uplink reference signal from each of the plurality of mobile terminals;
   determine a first reference signal channel estimate for each of the plurality of mobile terminals based on the corresponding received reference signal;
   determine an interference cancelled estimate for each of the plurality of mobile terminals using the corresponding first reference signal channel estimate;
   determine a corresponding second reference signal channel estimate for each of the plurality of mobile terminals based on the corresponding interference cancelled estimate;
   for each of the plurality of mobile terminals, demodulating a user data signal received from the mobile terminals using the second reference channel estimate corresponding to the mobile terminal; and
   perform a first error checking of the demodulated user data for each of the plurality of mobile terminals.

10. The base station according to claim 9, wherein, in a case where the first error checking of the demodulated data for one of the plurality of mobile terminals yields a failure, the base station further uses the demodulated user data and the second reference signal channel estimate corresponding to at least one of the mobile terminals other than the mobile terminal yielding the failed first error checking to:
   cancel the interference from the signal corresponding to the mobile terminal yielding the first failed error checking; and
   regenerate the data signal for the mobile terminal yielding the first failed error checking.

11. The base station according to claim 10, wherein cancelling the interference from the signal corresponding to the mobile terminal yielding the first failed error checking includes:
   (a) multiplying the second reference signal channel estimate corresponding to at least one of the mobile terminals passing the error checking by the demodulated user data corresponding to the same at least one of the mobile terminals passing the error checking; and
   (b) subtracting the multiplication result of step (a) from a received composite signal of the plurality of mobile terminals.

12. A method for wireless communication in a wireless communication network, the wireless communication network having a first mobile terminal and a second mobile terminal arranged in virtual multiple input, multiple output ("V-MIMO") communication with a base station, the method comprising:
   estimating a first wireless communication uplink channel corresponding to the first mobile terminal, the estimate being based on a first reference symbol signal received from the first mobile terminal and based on a second reference symbol received from the second mobile terminal, the second reference symbol signal being used to estimate and cancel an interference of a third reference symbol signal received from the second mobile terminal from the first reference symbol signal;
   estimating a second wireless communication uplink channel corresponding to the second mobile terminal, the estimate being based on the third reference symbol signal received from the second mobile terminal and the cancellation of interference by the first reference symbol signal received from the first mobile terminal based on a fourth reference signal received from the first mobile terminal;
   using the estimated first wireless communication uplink channel to demodulate a first data signal received from the first mobile terminal;
   using the estimated second wireless communication uplink channel to demodulate a second data signal received from the second mobile terminal; and
   performing a first error checking of the demodulated user data for the first mobile terminal and the second mobile terminal.

13. The method according to claim 12, further comprising, in a case where the first error checking of the demodulated data for first mobile terminal yields a failure:
   using the demodulated second data signal and the estimate of the second wireless communication uplink channel corresponding to the second mobile terminal to:
   cancel the interference from the signal corresponding to the first mobile terminal; and
   regenerate the data signal for the first mobile terminal.

14. The method according to claim 13, further comprising performing a second error checking on the regenerated data signal for the first mobile terminal.

* * * * *